July 17, 1956 A. P. DOUGLAS ET AL 2,754,696
SHIFTER MECHANISM FOR BICYCLE TRANSMISSION
Filed April 27, 1955 2 Sheets-Sheet 1

INVENTORS
ALVIN P. DOUGLAS
WILLIAM E. LONG
BY *Gobrick and Gobrick*
ATTORNEYS

July 17, 1956  A. P. DOUGLAS ET AL  2,754,696
SHIFTER MECHANISM FOR BICYCLE TRANSMISSION
Filed April 27, 1955  2 Sheets-Sheet 2

INVENTORS
ALVIN P. DOUGLAS &
WILLIAM P. LONG
BY *Gobrick and Gobrick*
ATTORNEYS

United States Patent Office 2,754,696
Patented July 17, 1956

2,754,696

SHIFTER MECHANISM FOR BICYCLE TRANSMISSION

Alvin P. Douglas, Cleveland Heights, and William E. Long, Mentor, Ohio, assignors to The Murray Ohio Manufacturing Company, Cleveland, Ohio, a corporation of Ohio Application April 27, 1955, Serial No. 504,274

6 Claims. (Cl. 74—781)

This invention is concerned with improvements in two speed bicycle transmissions such as is shown in U. S. Patent 2,291,285.

The transmission referred to has been in commercial use on a large number of bicycles for a sufficient period of time to indicate the points of depreciation and the causes of servicing requirements. One of the difficulties is the depreciation through excessive wear of the swivel mechanism in the shifting means, the wear being inherent in the referred to transmission since a biasing pressure remains on the swivel mechanism during a direct drive setting.

The general object of the present invention is the provision of a spring operated shifter mechanism which when combined with the transmission mechanism will serve the shifting purpose while avoiding constant thrust upon this swivel mechanism.

More specifically the present invention is directed to the provision of a shifter mechanism for the stated function which is spring operated to positive stops thereby to relieve the spring load from the swivel mechanism.

A further object of the invention is the provision of a shifter mechanism mounted upon but external to the axle, which may be assembled in mass production of bicycles with the connection for a shift operating pull rod readily locatable in the same position relative to the bicycle frame.

Other objects will become apparent from the following description referring to the accompanying drawings showing one embodiment of the invention, the essential characteristics being summarized in the claims.

In the drawings, Fig. 1 is a generally axial sectional view of the rear hub of a bicycle with transmission mechanism incorporating the features of my invention, however with the section planes of the upper and lower halves of the transmission proper taken at sixty degrees to each other.

Figure 1:
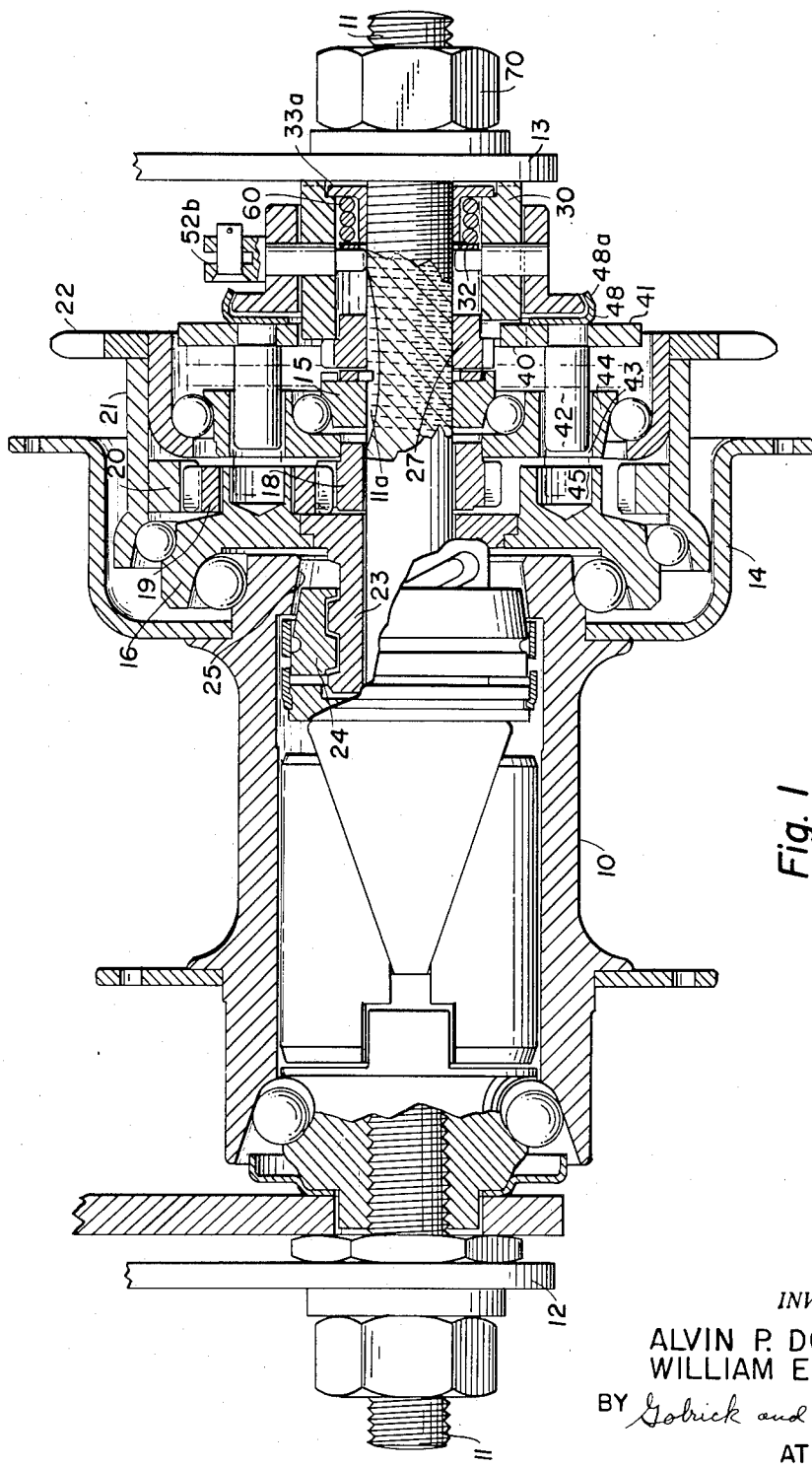
Figure 2:
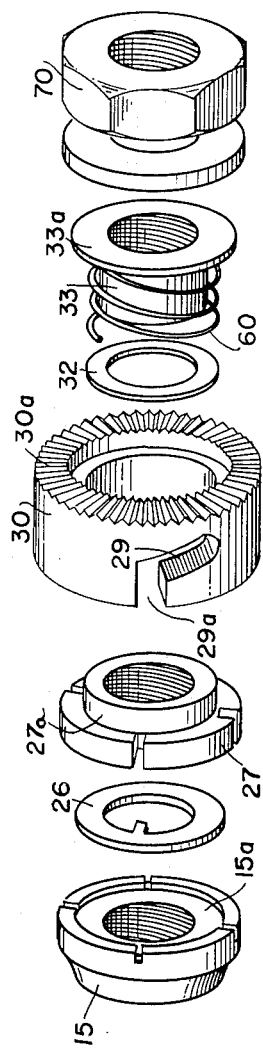
Fig. 2 is an exploded view of the non-rotating elements on the axle.
Figure 4:
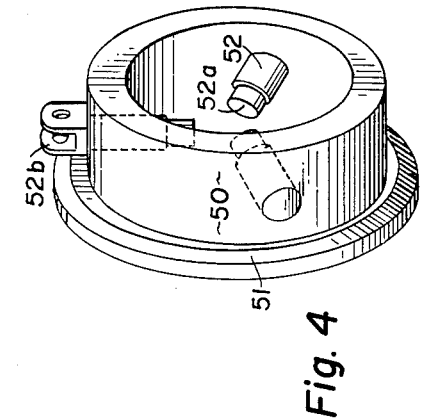
Fig. 4 is a perspective of the shifter element.

The transmission mechanism disclosed in the drawings is of the direct speed-low speed planetary type, wherein for reduced speed the sun gear is locked to a fixed axle or to an element rigidly fixed on the axle, with a sprocket carrying ring gear as an input element driving the planet carrier as output element through the planets at a reduced speed, the planet carrier serving as an element of a clutch means comprising part of a coaster brake mechanism. When the sun gear is unlocked from the axle or frame of the bicycle and locked to the planet carrier, the gear system is revolved as a unit with the sprocket and direct drive is obtained.

In Fig. 1 of the drawings is shown a wire spoke rear wheel hub structure 10 and a planetary system with shifter mechanism carried by a fixed axle 11 between the prongs 12 and 13 of the rear fork structure of a bicycle. The hub structure has an end enlargement 14 at the sprocket side to house the transmission gearing, the elements of which comprise a planet carrier 16, a sun gear 18, planet gears 19 and a ring gear 20 fixed to bearing sleeve structure 21 on the outer end of which is fixed a sprocket 22. The sun gear is mounted on a bearing and lock plate 44.

The planet carrier 16 has a coarse screw hub 23 for operating a clutch cone nut 24 which on forward rotation moves to the right to clutch the clutch cone seat 25 formed interiorly of the hub structure. Reverse movement of the planet carrier shifts the clutch cone member 24 axially inwardly, i. e., to the left to operate a well known brake mechanism.

The bearing arrangement for supporting the rotating elements is that shown and described in U. S. application Serial Number 474,411 filed December 10, 1954 and constitutes no part of the present invention. The internally threaded bearing cone 15, however, in the present application is locked upon the axle independently of any other part of the transmission and shifter mechanisms by a lockwasher 26 having a key lug engaged in axle keyway 11a and lock nut 27. The lock nut 27 has an annular seat and shoulder 27a formed thereon for supporting the inner end of a settable cam barrel 30, the outer end of which is serrated at 30a and counterbored to rest upon a flange 33a formed on a thimble member 33 in threaded engagement with the axle. The effective internal diameter of washer 26, that is, the dimension from key lug to opposite side, is such that the washer may be slid loosely onto the axle in assembly.

The cam barrel 30 has three equi-angularly spaced camming slots 29 with a helix angle of about 41° sloping inwardly to axially directed straight slot portions 29a. The diameter of the cam barrel 30 is greater than the diameter of the cone bearing lock nut 27, so that three key lugs 40 formed at the inner bore of a shiftable lock plate 41 may nest in the cam slots 29a when the lock plate 41 is shifted in an axially outward position.

Figure 3:
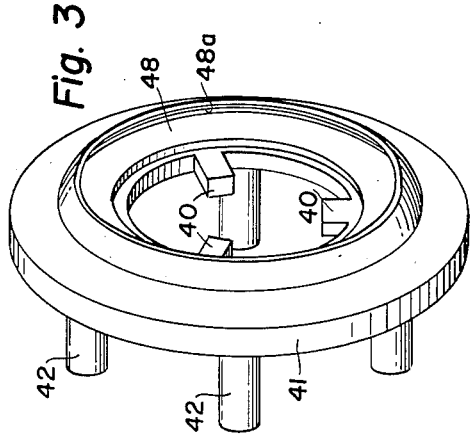
Fig. 3 is a perspective view of the shiftable locking element.

The plate 41 has lock pins 42 fixed thereon to project in an axial direction and normally rest in openings 43 formed in the sun gear bearing plate 44. The planet carrier 16 has sockets 45 into which these pins project when the lock plate is shifted from the position shown in Fig. 1 to the position indicated by the dot and dash lines in Fig. 1. Such inward position of the pins locks the gearing into a single rotating mass with the rear wheel sprocket 22. Since the lock plate rotates in this direct drive coupling, a swivel connection between the plate shifter means and the plate is necessary. As shown in Figs. 1 and 3, a cup-shaped element 48 is secured to the outer face of the plate 41 in any suitable manner. A rockable cylindrical shifter member 50 is provided with a beveled flange 51 which fits loosely into the cup 48 and is retained therein by an inwardly turned flange 48a.

The shifter member 50 is turnably fitted upon the tubular cam barrel 30 and has three radially extending pins 52 projecting inwardly to fit the camming slots 29 of the cam barrel. Since the cam slots are open at one end the pins 52 may be permanently secured to the shifter member 50.

The lock plate 41 is maintained in a normally inward position i. e. with the pins 42 in locked relation to the gearing system, and this inward position is maintained by a spring 60 on thimble 33 which abuts a washer 32 thrust inwardly against extensions 52a formed on the camming pins 52.

One of the pins 52 may have a clevis or yoke 52b formed as a head thereon which affords a pivot connection for a manually operated pull rod extending to the forward part of the bicycle, the pull rod being omitted from the drawings.

In assembling the apparatus, the coaster brake mechanism and gearing mechanism are first assembled within the hub structure upon the axle including internally threaded cone bearing element 15, loosely fitting washer 26 and lock nut 27. The loosely fitting washer when inserted in the counterbore 15a is centered and keyed to the axle at keyway 11a. Lock plate 41 and shifter member 50 are swivel connected and together with the cam barrel with pins 52 disposed in slots 29 are then placed in position. Washer 32, spring 60 and threaded thimble 33 are then assembled. The hub is then placed between the fork prongs 12 and 13. The cam barrel 30 and shifter sleeve 50 are then manually turned to bring the pin head 52b to the desired pull rod engaging position. The serrations 30a on the outer end of the cam barrel are thus presented to the inner face of fork prong 13 and tightening of the outer axle nut 70 locks the cam barrel 30 in set position between the shoulder on the cone bearing lock nut 27 and the inner face of the prong. The tubular cone element or barrel 30, which thrusts upon the lock nut and aids in securing the cone 15 therefore may be considered as part of a bearing cone mechanism.

The positive stop for the action of the spring 60 comprises the camming pins 52 bearing against the rounded end walls of the slots 29 on low speed setting and the extensions 52a of pins 52 against the end of the lock nut 27 on direct speed setting. Thus the lock pins 42 are prevented from bottoming in the sockets 45 of the planet carrier on direct drive hook up and no friction on the swivel connection develops. Upon shifting for low speed, the locking keys 40 on the locking plate 41 do not bottom in the slots or keyways 29a and all frictional wear on the swivel connection is eliminated other than that involved in the actual shifting of the plate.

To those skilled in the art it will be noted that both the coaster brake elements, the speed change elements and the shipper elements are accessible from the sprocket side of the hub for servicing purposes.

In manufacturing assembly the point of pull rod attachment can be located at the desired position whereby the pull rods from one assembly to the other will all have the same extent of angular movement imparted thereto by the camming pin carrying member 50. The camming reaction on the member 30 is transmitted directly to the fork prong 13 by reason of the gripping serrations 30a. Also it will be noted that the use of a weakened hollow axle with the use of attendant delicate parts is avoided. Also it should be noted that the shifter mechanism is located entirely within the fork structure of the bicycle where it is protected.

We claim:

1. A shifter mechanism for two speed bicycle transmissions comprising a bicycle axle mounted on the prongs of a rear fork of a bicycle frame, a bearing cone mechanism fixed on the axle, a sun gear rotatably supported by the bearing cone mechanism, a planet gear carrier having planet gears meshing with the sun gear, said bearing cone mechanism including a tubular formation extending outwardly to a gripping contact with the inner face of the axle prong of the rear fork structure of the bicycle, a rockable member co-axially arranged on the tubular formation, a camming pin connection between the rockable member and the tubular formation, an axially shiftable locking plate swivel connected to the rockable member, means on the locking plate for locking the carrier against rotation relative to the sun gear, and a spring acting on the rockable member to maintain the locking plate in a normally inward position relative to the planet carrier.

2. A shifter mechanism for a two speed bicycle transmission comprising a bicycle axle mounted on the prongs of the rear fork of a bicycle frame, a bearing cone mechanism secured to the axle, a sun gear rotatably supported by the bearing cone mechanism, a planet gear carrier having planet gears in mesh with the sun gear, a helically slotted cam barrel having the slots open at one end, a shifter member revolvably mounted on the cam barrel, said shifter member having radially extending pins thereon disposed in the cam barrel slots, an axially shiftable transmission locking member connected to the shifter member by a swivel connection whereby a revolving movement of the shifter member will effect an axial shifting of the transmission locking member to lock the sun gear and carrier together and a compression spring surrounding the axle, said spring extending into the cam barrel and thrusting upon the camming pins of the shifter member to thereby maintain the transmission locking member in a normally inward direct drive locking position.

3. A shifter mechanism for a two speed bicycle transmission comprising a bicycle axle mounted on the prongs of the rear fork of a bicycle frame, a bearing cone secured to the axle, a sun gear rotatably supported by the bearing cone, a planet carrier having planet gears in mesh with the sun gear, a helically slotted cam barrel having the slots terminating in axially extending keyway slots, said cam barrel being supported in radially spaced relation to the axle, a lock nut for said bearing cone threaded on the axle having a supporting thrust shoulder for the inner end of the cam barrel, a spring supporting thimble member threaded on the axle and loosely supporting the outer end of the cam barrel with the outer end of the cam barrel exposed to contact with the inner face of the axle prong of the rear fork structure of the bicycle, a shifter member revolvably mounted on the cam barrel, said shifter member having radially extending pins thereon disposed in the cam barrel slots, an axially shiftable transmission locking member connected to the shifter member by a swivel connection whereby a revolving movement of the shifter member will effect an axial shifting of the transmission locking member and a compression spring surrounding the axle and supported on the thimble, said spring extending into the cam barrel and thrusting upon the camming pins of the shifter member to thereby maintain the transmission locking member in a normally inward direct drive locking position.

4. A shifter mechanism for a two speed bicycle transmission comprising a bicycle axle mounted on the rear fork prongs of a bicycle frame, a bearing cone mechanism secured to the axle, a sun gear rotatably supported by the bearing cone mechanism, a planet carrier having planet gears meshing with the sun gear, a helically slotted cam barrel having a slot terminate in an axially extending keyway slot, said cam barrel being supported in radially spaced relation to the axle, said bearing cone mechanism having a supporting thrust shoulder for the inner end of the cam barrel, a spring supporting thimble member threaded on the axle and loosely supporting the outer end of the cam barrel with the outer end of the cam barrel exposed to contact with the inner face of the axle prong of the rear fork structure of the bicycle, a shifter member mounted on the cam barrel for limited rocking motion, said shifter member having a radially extending pin thereon disposed in the cam barrel slot, an axially shiftable transmission locking member connected to the shifter member by a swivel connection whereby a rocking movement of the shifter member on the cam barrel will effect an axial shifting of the transmission locking member, a compression spring surrounding the axle and thrusting on the thimble, said spring extending into the cam barrel and thrusting upon the camming pins of the shifter member to thereby maintain the transmission locking member in a normally inward direct drive position.

5. A shifter mechanism for a two speed bicycle transmission comprising a bicycle axle mounted on the prongs of the rear fork of a bicycle frame, a bearing cone mechanism fixed on the axle and adapted to rotatably support a sun gear of the transmission, said transmission having a planet carrier with planet gears thereon in mesh with the sun gear, a sun gear on the bearing cone mechanism, a tubular formation coaxially arranged on the axle between the fork prong and the fixed bearing cone arranged in fixed relation to the axle and the fork prong, a rockable member on the tubular formation, a helical cam and pin connection between the fixed tubular formation and said rockable member, a gear locking member swivel connected to the rockable member whereby rocking movement of the rockable member effects axial shifting of the gear locking member to lock the sun gear to the planet carrier and spring means acting on the lockable member to maintain the gear locking member in gear locking position.

6. A shifter mechanism as characterized in claim 5 wherein the spring means is disposed within the tubular formation between the rockable member and the fixed tubular formation.

References Cited in the file of this patent
UNITED STATES PATENTS

| | | |
|---|---|---|
| 2,171,886 | Musselman | Sept. 5, 1939 |
| 2,453,580 | Lusk | Nov. 9, 1948 |